United States Patent [19]

Scherzinger et al.

[11] Patent Number: 4,943,746
[45] Date of Patent: Jul. 24, 1990

[54] LIQUID COOLED SALIENT POLE ROTOR SUPPORT WEDGES

[75] Inventors: William M. Scherzinger, Brick; Tsuwei Chu, Oceanport; Leon M. Kasdan, West Long Beach, all of N.J.

[73] Assignee: Allied-Signal Inc., Morris Township, Morris County, N.J.

[21] Appl. No.: 326,149

[22] Filed: Mar. 20, 1989

[51] Int. Cl.$^5$ .............................. H02K 1/32
[52] U.S. Cl. ........................ 310/61; 310/54; 310/59; 310/269
[58] Field of Search .............. 310/54, 58, 59, 61, 310/261, 269, 60 A, 60 R

[56] References Cited

U.S. PATENT DOCUMENTS

| | | | |
|---|---|---|---|
| 863,814 | 8/1907 | Underwood | 310/54 |
| 3,032,665 | 5/1962 | Wilhelmson | 310/54 |
| 3,260,872 | 7/1966 | Potter | 310/61 |
| 3,543,062 | 11/1970 | Banchieri | 310/59 |
| 4,602,177 | 7/1986 | Eckels et al. | 310/59 |
| 4,691,131 | 9/1987 | Nakano | 310/54 |
| 4,728,840 | 3/1988 | Newhouse | 310/54 |

FOREIGN PATENT DOCUMENTS

434539 11/1974 U.S.S.R. .............................. 310/54

Primary Examiner—Mark O. Budd
Assistant Examiner—D. L. Rebsch
Attorney, Agent, or Firm—Glen M. Diehl; Howard G. Massung

[57] ABSTRACT

Apparatus and method for dissipating heat in a generator. A rotor having support wedges between each of its poles is mounted on a bored shaft in which a bored spindle having helical grooves along its outer diameter is fixed. A cooling medium is circulated through the bored shaft upon rotation of the shaft. The shaft has at least one outlet and one inlet through which the cooling medium can radially exit and return, respectively. Each of the support wedges has an inlet and an outlet between which a bore extends. In a preferred embodiment, a manifold is disposed about the bored shaft and mated to each of the support wedges so as to circulate the cooling medium from the bored shaft to the support wedges and back to the bored shaft, thereby dissipating heat from the generator rotor. In alternate embodiments more than one manifold is used to circulate the cooling medium through the support wedges.

25 Claims, 4 Drawing Sheets

LIQUID COOLED SALIENT POLE ROTOR SUPPORT WEDGES

BACKGROUND OF THE INVENTION

This invention relates to apparatus and methods for dissipating heat in a generator. More specifically, it relates to apparatus and method for circulating a cooling medium through support wedges in the generator rotor to improve heat transfer from the windings on the generator rotor, thereby allowing increased current densities in the rotor windings.

One method of dissipating heat created during the operation of a generator is the use of a conduction cooling system. In such a system, a cooling medium, such as oil, is transferred through cooling channels in the generator to remove heat from the various generator components. Such systems are sealed and, therefore, are impervious to environmental elements and atmospheric conditions, and they also allow operation of the generator at all attitudes. Conduction cooling systems, therefore, offer many advantages for generators.

The conduction cooling systems for generators of the prior art have provided adequate heat dissipation for generators operating under past output requirements. Recently, however, the trend in state of the art generators, particularly aircraft generators, has been towards increased generator output ratings and lighter weight. Known conduction cooling systems do not offer sufficient heat dissipating capacity to allow the generator to provide the increased output ratings at the lower weights. A cooling system which offers greater heat dissipating capacities so that greater current densities can be generated in the rotor of the generator so as to provide greater generator output ratings and be nonsensitive to different attitudes, therefore, is required.

SUMMARY OF THE INVENTION

The present invention provides improved apparatus and method for dissipating heat in a generator. The generator has a bored shaft in which a bored spindle is mounted. A cooling medium is circulated through the bored shaft under pressure by being pumped through the bore in the spindle in one direction and then outside the spindle through the shaft's bore in the opposite direction. The generator further includes a rotor having several poles which is mounted on the shaft and support wedges which are placed between each of the poles on the rotor to provide support for conductors wound on the poles against the centrifugal forces exerted during operation of the generator. The shaft has at least two orifices in its side which extend radially from the bore in the shaft. At least one orifice is used to allow the cooling medium to exit the shaft and at least one orifice is used to allow the cooling medium to return to the shaft once it has been circulated to other areas of the generator through conduits provided in accordance with the invention. Each of the support wedges, in accordance with the invention, has two ports, and a bore extending between the two ports. A manifold having an inner sleeve adapted to be fit over the shaft and a mating face for each of the support wedges is provided. The manifold is attached to each of the support wedges at the mating faces. The manifold has a port on its inner sleeve for each orifice in the shaft. The manifold further has ports which mate with each of the ports in each of the support wedges. The manifold has a system of bores from the ports at the inner sleeve to the support wedge ports to transfer the cooling medium from one or more orifices in the shaft to the inlet port in each of the support wedges and back to the shaft. A bushing having slots in opposite sides of its faces which mate with the orifices in the generator shaft fits into the bore of the shaft around the spindle and directs the cooling medium through the orifices in the shaft.

It is an object of the present invention to provide an improved conduction cooling system for a generator which provides cooling conduits through support wedges which are positioned between the poles on a generator rotor.

It is a further object of the present invention to provide a conduction cooling system which provides a short heat transfer path from the generator rotor winding conductors to the cooling medium.

It is a further object of the present invention to provide a conduction cooling system which increases the efficiency of the dissipation of heat from the rotor.

It is a further object of the present invention to provide a generator cooling system which allows greater current densities to be developed in the rotor of the generator and, therefore, a greater output rating for the generator while reducing the weight.

DESCRIPTION OF THE PREFERRED EMBODIMENT

Figure 1:
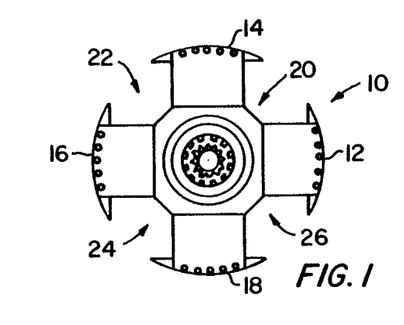
FIG. 1 illustrates a generator rotor having four poles.

FIG. 1 illustrates a generator rotor 10 having four poles 12, 14, 16 and 18, each of which is wound with conductors, called windings. During operation of the generator current passes through the windings, thereby creating heat. A certain amount of heat must be removed from the generator, particularly from the windings, to allow efficient operation of the generator and to keep the winding temperature beloW the point where the insulation begins to break down. If an insufficient amount of the heat is removed from the generator, then the power output from the generator will be limited. Further, the increased heat will cause the quality of the insulation within the generator to degrade quicker, thereby decreasing the life and reliability of the generator. A system to provide cooling for the generator is, therefore, an important component of the generator.

Figure 2:
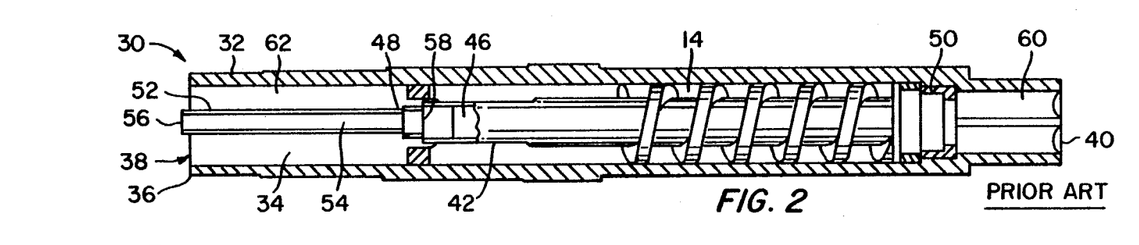
FIG. 2 illustrates a generator shaft assembly of the prior art.

FIG. 2 illustrates a shaft assembly 30 in which a cooling medium is circulated to dissipate heat created in the generator. The shaft assembly 30, comprises a shaft 32 having a bore 34 which extends from a first end 36 having an opening 3B to a second closed end 40 and a rod 42 mounted inside the shaft 32 having a bore 46 which extends the length of the rod 42 from a first opening 48 to a second opening 50, and preferably a helical groove 44 around the outer surface of a portion of its length. The rotor 10 of FIG. 1, where a considerable amount of heat is generated, is shrink fit onto the shaft 32 by heating the rotor 10 and chilling the shaft 32.

In the cooling system of FIG. 2, the cooling medium is fed under pressure by a pump from a reservoir to a transfer shaft 52. A bore 54 extends the length of the transfer shaft 52 from an opening 56 near the open end 36 of the shaft 32 to a second opening 58. The end of the transfer shaft 54 having the second opening 58 is extended into the bore 46 of the rod 42 through the opening 48 in the rod 42 where the rod 42 and the transfer shaft 52 are assembled in an annulus type configuration. The cooling medium is transferred through the transfer shaft 52 into the bore 46 of the spindle 42. An 0-ring, which is not shown, provides a seal at the opening 56 of the transfer shaft 52 thereby preventing the leakage of the cooling medium.

The cooling medium is transferred through the bore 46 in the rod 42 to a first cavity 60 in the shaft assembly 30. As the shaft 32 and the rod 42 rotate together, the helix groove 44 provides a path through which the cooling medium is transferred from the first cavity 60 to a second cavity 62. The cooling medium then exits the shaft assembly 30 through the first opening 38 where it is returned to the reservoir.

The cooling medium can be any lubricating or hydraulic fluid. A preferred cooling medium for many generators is oil since the cooling medium also serves to lubricate bearings in same generators.

As the cooling medium is circulated through the shaft assembly 30, heat is conducted from the various components in the generator to the shaft 32 and to the cooling medium so that when the cooling medium is removed from the shaft assembly 30, the heat is also removed. The conduction cooling system of FIG. 2, however, has been found to be unsatisfactory for generators which must operate at increased output ratings and lighter with lights as is required in state of the art generators. This is because the increased output is generally obtained by increasing the current density in the windings on the rotor 10, thereby generating more heat in the generator. Further, the increased heat is created at the windings, some distance from the cooling medium so that the heat can not be efficiently removed because of the long heat transfer path.

Figure 3:
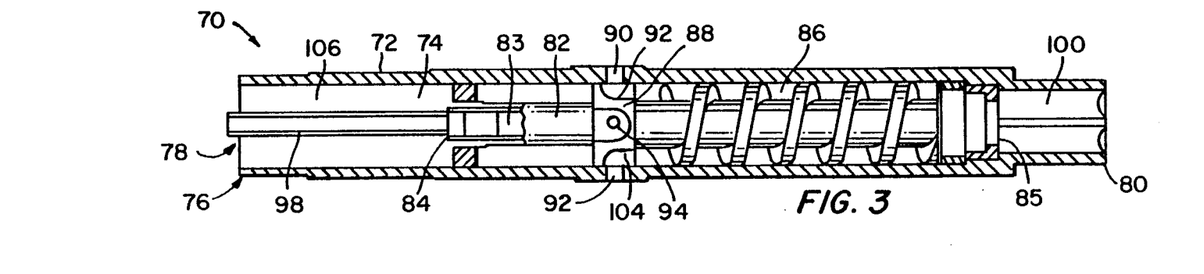
FIG. 3 illustrates a shaft assembly in accordance with a preferred embodiment of the present invention.
Figure 4:
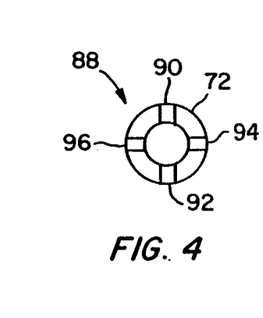
FIG. 4 illustrates a sectional view of the shaft of FIG. 3.

FIG. 3 illustrates a shaft assembly 70, for use with the four pole rotor 10 of FIG. 1, in accordance with a preferred embodiment of the present invention. The shaft assembly 70 comprises a shaft 72 having a bore 74 extending from a first end 76 having an opening 78 to a second closed end 80 and a rod 82 mounted inside the shaft 72 having a bore 83 which extends the length of the rod 82 from a first opening 84 to a second opening 85 and preferably a helical groove 86 around the outer surface of a portion of its length, as well as a direction control bushing 88. Additionally, four orifices extending radially from the bore 74 and spaced at 90 degrees are provided in the side wall of the shaft 72. FIG. 3 illustrates three of the orifices 90, 92 and 94. A fourth orifice is located directly opposite the orifice 94. FIG. 4 shows a sectional view of the shaft assembly 72 and more clearly indicates the four orifices 90, 92, 94 and 96 which are provided in the side wall of the shaft 72.

The shaft assembly 70 of FIG. 3 functions similarly to the shaft assembly 30 of FIG. 2 except that the cooling medium exits the shaft 72 and then is returned to the shaft 72 after it has been transferred through additional conduits in the generator. A cooling medium, such oil or any other fluid, is pumped from a reservoir through a transfer shaft 98, which is similar to the transfer shaft 52 of FIG. 2. The cooling medium is transferred through the bore 83 in the rod 84 to a first cavity 100. The cooling medium is then transferred in the opposite direction through the helical groove 86. At the end of the helical groove 86, however, the direction control bushing 88 directs the cooling medium through two of the orifices 90 and 92 by means of semicircular cutouts 102 and 104 respectively, on one side of the bushing 88, so that the cooling medium can be circulated through other conduits. When the cooling medium returns to the shaft assembly 70 through orifices 94 and 96, the bushing 88 directs the cooling medium to a second cavity 106 by means of two semicircular cutouts in the opposite side of the bushing 88.

Figure 5:
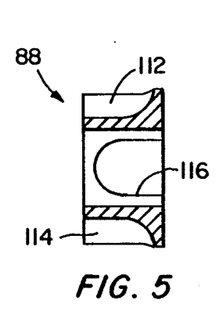
FIG. 5 illustrates the direction control bushing in greater detail.
Figure 6:
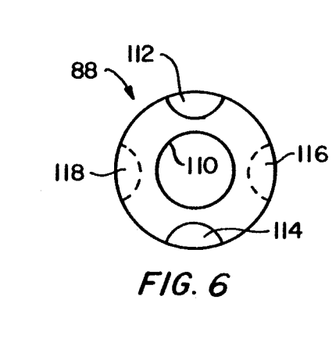
FIG. 6 illustrates a view of the direction control bushing of FIG. 5 along the axis of the generator shaft.

The direction control bushing 88 is illustrated in greater detail in FIGS. 5 and 6. The direction control bushing 88 has an inner sleeve 110 with a diameter adapted so that the bushing 88 can slide over the rod 82. The outer diameter of the bushing 88 is preferably 0.001 inches greater than the inner diameter of the bore 74 in the shaft 72 once the shaft 72 is shrink fit to the bushing 88. The shrink fit affords a tight fit around the circumference of the bushing 88.

The direction control bushing 88 has four semicircular scalloped faces 112, 114, 116 and 118 which are cutout. The faces 112, 114, 116 and 118 are spaced at 90 degree intervals around the bushing 88 and mate with the four shaft orifices 90, 92, 94 and 96, respectively, when the bushing 88 is inserted into the bore 74 of the shaft 72 and over the rod 82. Each side of the direction control bushing 88 has two cut-out faces which are spaced 180 degrees.

The rotor 10 of FIG. 1 rotates at high speeds with the shaft assembly 70 during the generation of power, subjecting the windings on each of the poles 12, 14, 16 and 18 to significant centrifugal forces which tend to cause the windings to separate from the rotor at high speeds of revolution. To support these windings against such forces it is known in the art of generator design to mount wedges in the areas 20, 22, 24 and 26 between each of the respective poles 12, 14, 16 and 18. These support wedges contain the windings against the pole body so as to oppose the centrifugal force during the rotation of the rotor 10. The support wedges provided in the areas 20, 22, 24 and 26, therefore, are situated close to the windings on the rotor 10, where most of the heat in the generator is created. In accordance with the present invention the support wedges are bored so as to provide a conduit through which the cooling medium is transferred, thereby providing a short path for heat transfer from the windings to the cooling system and, therefore, a more efficient cooling system.

Figures 7, 8, 9, 10:
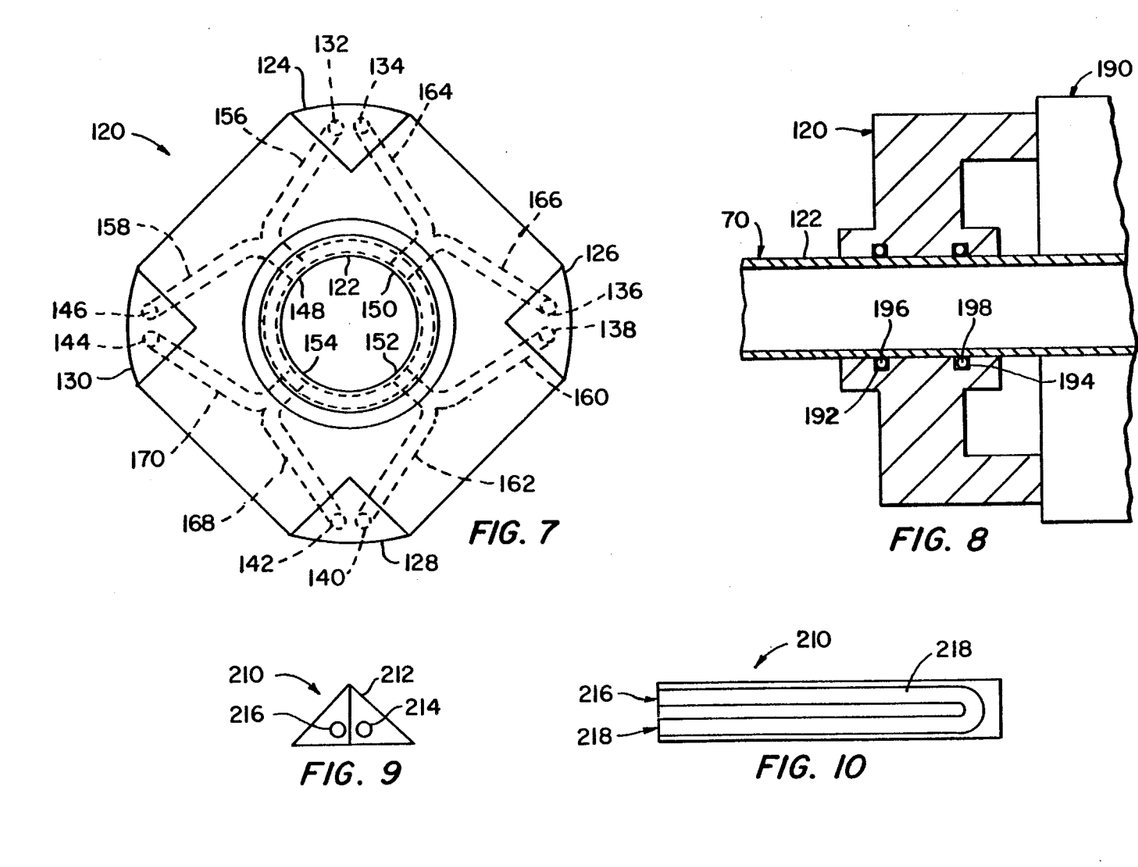
FIG. 7 illustrates a section view of a manifold for use with a four pole generator rotor in accordance with a preferred embodiment of the invention.
FIG. 8 illustrates the assembly of the manifold on the generator shaft and support wedges.
FIG. 9 illustrates a support wedge having an inlet port and an outlet port in accordance with a preferred embodiment of the invention.
FIG. 10 illustrates a side view of the support wedge of FIG. 9 along the axis of the generator shaft.

FIG. 7 illustrates a manifold 120, in accordance with a preferred embodiment of the invention, which transfers the cooling medium from the orifices 90 and 92 in the shaft assembly 70 to each of the support wedges and the back to the shaft assembly 70. The manifold 120 has a sleeve 122 adapted to fit over the shaft 72. The manifold 120 further bas mating faces 124, 126, 128 and 130, one for each support wedge.

Each mating face 124, 126, 128 and 130 has two ports 132 and 134, 136 and 138, 140 and 142 and 144 and 146, respectively, which mate with ports in each of the support wedges. The manifold 120 is attached to each of the support wedges, preferably at the respective mating face. The manifold 120 also has four ports 148, 150, 152 and 154 on the inner surface of the sleeve 122. Each of these ports 14S, 150, 152 and 154 mate with one of the shaft orifices 90, 92, 94 and 96 when the manifold 120 is disposed about the shaft assembly 70.

In the preferred embodiment, two of the manifold ports 148 and 152 along the inner sleeve 122 receive the cooling medium through the orifices 90 and 92, respectively, in the shaft 72 as directed by the faces 102 and 104, respectively, in the direction control bushing 88. The cooling medium must be transferred from the two ports 148 and 152 to conduits in four support wedges. Each manifold input port 148 and 152, therefore, supplies cooling medium to conduits in two support wedges. Input port 148, therefore, has a bore 156 extending to port 132 at the wedge mating face 124 and. also has a bore 158 extending to the port 146 at wedge mating face 130. Likewise, the input port 152 has a bore 160 extending to the port 138 at wedge mating face 126 and a second bore 162 extending to the port 140 at wedge mounting face 12S. The manifold 120, therefore, transfers cooling medium from the shaft assembly 70 to each of the support wedges.

A similar situation exists in the preferred embodiment when the cooling medium is returned to the shaft assembly 70. The manifold ports 150 and 154 transfers cooling medium to the orifices 94 and 96 in the shaft assembly 70 from the four support wedges. The port 150, therefore, has a bore 164 extending to the port 134 at wedge mating face 124, as well as a bore 166 which extends to the port 136 at wedge mating face 126. The port 154 has a bore 168 extending to port 142 at wedge mating face 128 and a second bore 170 extending to the port 144 at wedge mating face 130.

FIG. 8 illustrates a section view of the manifold 120 assembled with the shaft assembly 70 and the rotor assembly 190 in accordance with a preferred embodiment. The rotor assembly 190 comprises the four pole rotor and the support wedges which fit between each of the plurality of poles. The manifold 120 is attached to each of the support wedges in the rotor body 190 to which it supplies the cooling medium. The manifold 120 has two channels 192 and 194 in the surface of the inner sleeve 122. The ports 148, 150, 152 and 154 in the inner sleeve are located in between the channels 192 and 194. 0-rings 196 and 198 are inserted into the channels 192 and 194, respectively, so as to prevent oil leakage from the shaft assembly 70 during operation.

FIGS. 9 and 10 illustrate a support wedge 210 used to support the windings in the rotor 10, which fits into spaces 20, 22, 24 and 26 between each of the poles 12, 14, 16 and 18 in the rotor 10. The support wedge 210 has a face 212 which mates with one of the mating faces 124, 126, 128 or 130 on the manifold 120. Two ports 214 and 216 are provided in the face 212. A bore 218, extends between the ports 214 and 216. One of the ports 214 or 216 receives the cooling medium from the manifold)d 120. The cooling medium circulates through the bore 218 in the wedge. Each of the wedges 210 conducts heat from the windings in the rotor 10 to the cooling medium passing through the bore 218. The cooling medium is then expelled through the other port 214 or 216 into the manifold 120 and into the shaft assembly 70, so as to remove heat from the windings.

The cooling medium must be supplied to the cooling system with sufficient pressure to enable circulation of the cooling medium through all of the conduits. The higher the rotational speed of the generator, the greater the pressure drops in the cooling system due to centrifugal forces. Therefore, as the rotational speed is increased, the pressure in the cooling system may have to be increased as well.

The components of the invention; the manifold 122, the support wedges 210 and the direction control bushing 88 are constructed with aluminum because of its light weight and good heat transfer qualities. Other materials, however, can be used. By way of example only, titanium, nonmagnetic steel or composite materials could also be used. Additionally, the support wedges are coated with aluminum oxide or any other insulating material, so as to insulate the support wedges from the windings.

Alternate embodiments of the present invention for use with a four pole rotor can be constructed by one skilled in the art. For example, the number of orifices provided in the shaft 72 can be varied, as long as there is at least one inlet and one outlet for the cooling medium. Additionally, the placement of the orifices in the shaft 72 can be varied. In either case, the construction of the manifold and the direction control bushing must be modified accordingly.

As another example of a possible variation, the conduits or bores in the manifold may be constructed in any number of ways to distribute the cooling medium from the shaft to the rotor support wedges and then back again.

The invention is not limited to use with a generator with a four pole rotor. With a modification to the manifold of the preferred embodiment, the invention can be practiced with generators having any number of poles on their rotor.

The cooling system in any embodiment of the present invention need not supply all of the support wedges with the cooling medium, even though that arrangement provides the most efficient cooling system. In generators, therefore, where there are a large number of poles and support wedges, such that the pressure in the cooling system would no longer circulate the cooling medium through conduits in all of the support wedges, the number of support wedges having conduits could be reduced to overcome the problem if the system pressure could not be increased.

Figure 11:
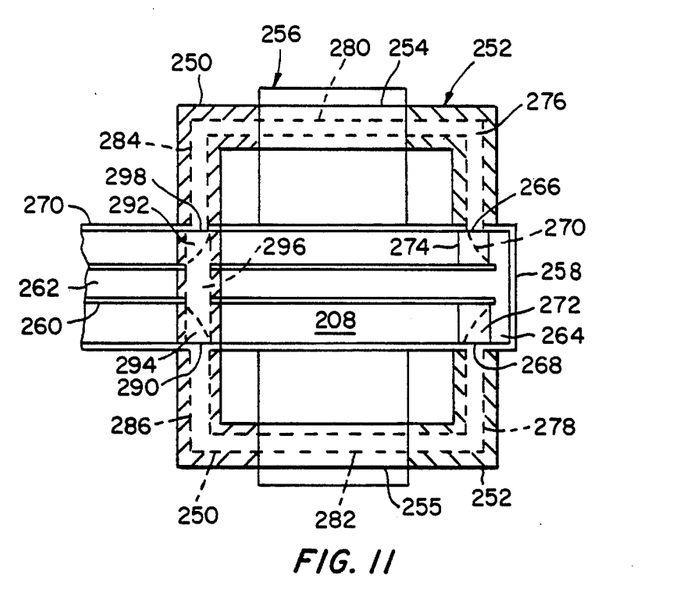
FIG. 11 illustrates an alternative embodiment of the present invention.

In the cases where a rotor has a large number of poles, the support wedges which fit between the poles of the rotor may not be wide enough to provide a U-shaped bore therein. In such cases, the cooling medium can be transferred through the support wedges by providing an input port at one end of the support wedge, an output port at the other end of the support wedge and a bore extending straight through the support wedge between the input and output ports. Referring to FIG.

11, a plan view of an alternative embodiment of the present invention having such an arrangement is illustrated. The manifolds 250 and 252 are mounted to opposite ends of each of the support wedges 254 and 255 located between the poles of the generator rotor 256 to which the cooling medium is supplied. The manifolds 250 and 252 are preferably disposed about the shaft assembly 258 in a manner similar to that illustrated in FIG. 8 of the preferred embodiment. Inside the shaft assembly 258, a rod 260 with an axial bore 262, through which the cooling medium is transferred under pressure, is mounted. When the cooling medium exits the rod 260 it enters the cavity 264 and is directed through orifices 266 and 268, extending radially in the shaft 270, by the cutout faces 270 and 272, respectively, in the bushing 274. It is preferable to provide a plurality of radially extending orifices in order to provide fail-safe operation in case of a blockage, however, a single orifice is all that is necessary.

The cooling medium exits the shaft assembly 258 through orifices 266 and 268 and is transferred through the conduits 276 and 27S, respectively, in the manifold 252. The cooling medium is then transferred through conduits 280 and 282 in the support wedges 254 and 255, respectively, and then through the conduits 284 and 286, respectively, in the manifold 250. The cooling medium enters the shaft assembly 258 through the orifices 288 and 290 and is directed by the cutout faces 292 and 294 in the bushing 296.

In FIG. 11, all of the cooling medium is directed out of the shaft assembly 258 through the support wedges 254 and 255. If, however, it is desirable to circulate the cooling medium through the axial length of the shaft assembly nearest the generator rotor 256, then the bushing 274 can be modified so that it only directs a portion of the cooling medium through the orifices 266 and 268, allowing a portion of the cooling medium to flow in the cavity 298. The bushing 296 would also have to be modified so as to allow the cooling medium to exit the cavity 298. The manifolds 250 and 252 can be constructed to provide conduits to as many support wedges as necessary to adequately cool the generator. Further, as before, each of the manifolds 250 and 252 can be constructed so as to supply cooling medium to a plurality of support wedges from a single orifice in the shaft 270.

Figure 12:
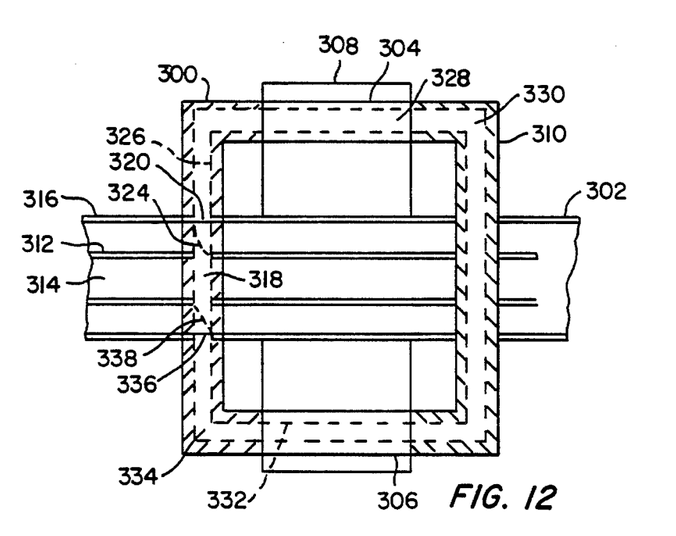
FIG. 12 illustrates a second alternative embodiment of the present invention.

FIG. 12 illustrates another alternate embodiment of the present invention wherein the cooling medium is transferred through each of the support wedges in one direction. A first manifold 300 is disposed about the shaft assembly 302 and attached to each of the support wedges 304 and 306 in the rotor 308 to which it supplies and receives the cooling medium. A second manifold 310 is connected to each of the support wedges 304 and 306 which receive the cooling medium. As before, the shaft assembly 302 comprises rod 312 having a bore 314 mounted in a bored shaft 316. The cooling medium is transferred under pressure through the bore 314 and then in the opposite direction in the shaft assembly 302 around the rod 312. When the cooling medium contacts the bushing 318, it is directed through an orifice 320 out of the shaft assembly 302 by the cutout face 324. Although not illustrated, it is preferable to provide more than one orifice 320 through which the cooling medium can exit the shaft assembly 302.

Once the cooling medium exits the shaft 316, it is transferred through a conduit 326 in the first manifold 300 to a conduit 328 in the support wedge 304. The second manifold 310 has a conduit 330, through which the cooling medium is transferred from the conduit 328 to a conduit 332 in another support wedges 306. The first manifold 300 also has another conduit 334 which transfers the cooling medium back to the shaft assembly 302 through an orifice 336. The bushing 318 has a cutout face 338 on the opposite side as the cutout face 324 which directs the cooling medium into the shaft assembly 302.

Figure 13:
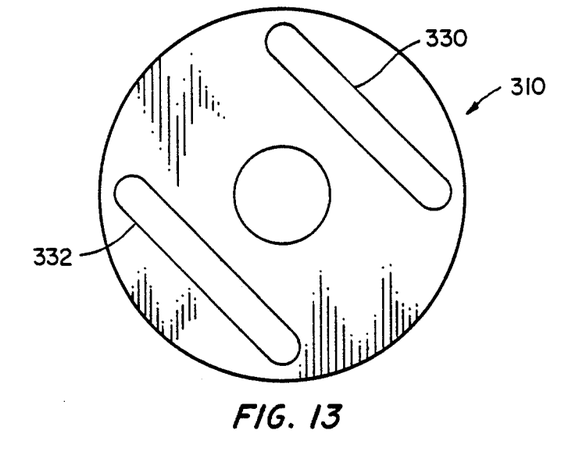
FIG. 13 illustrates a manifold used in the embodiment of FIG. 12.

FIG. 13 illustrates the second manifold 310 of FIG. 12. The manifold 310 has two conduits 330 and 332 through which the cooling medium is transferred from one support wedges to another. If the rotor 308 has a flush surface area which mates with the manifold, then the conduits 330 and 332 can be merely cutout of the face of the manifold 310.

Figure 14:
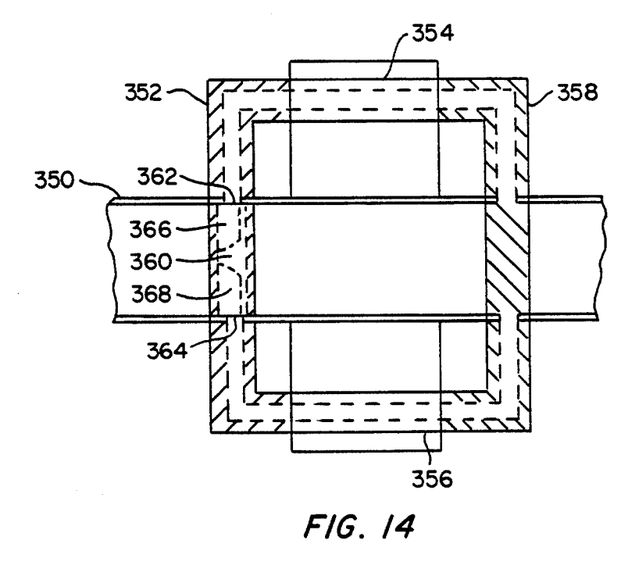
FIG. 14 illustrates a third alternative embodiment of the present invention.

FIG. 14 illustrates an alternate embodiment of the present invention wherein the cooling medium is transferred straight through a shaft 350. A first manifold 352 is disposed about the shaft 350 to supply the cooling medium to one or more of the support wedges 354 and 356. A second manifold 358 receives the cooling medium from the support wedges 354 and 356 and transfers the cooling medium back to the shaft 350. A bushing 360 which fits within the shaft 350 is used to direct the cooling medium out of the shaft 350 through one or more orifices 362 and 364. If all of the cooling medium is to be transferred through the support wedges, then the bushing 360 is solid, as shown. If, however, only a portion of the cooling medium is to be transferred through the support wedges, then the bushing 360 should have a hole in its center so that the cutout faces 366 and 368 direct only a portion of the cooling medium through the orifices 362 and 364, respectively.

We claim:
1. A conduction cooling system through which a cooling medium can be circulated for dissipating heat in a generator, comprising:
   a shaft adapted to be rotated and having an axial bore through which the cooling medium can be circulated and at least two orifices extending radially from said bore;
   a rotor mounted on said shaft having a plurality of poles;
   a plurality of support wedges positioned between each of said plurality of poles, at least one of said plurality of support wedges having an inlet and an outlet between which a bore extends;
   means disposed in said bore of said shaft for directing the cooling medium out of said shaft through at least one of said orifices and into said shaft through at least one of said orifices; and
   means disposed about said shaft for transferring the cooling medium from said orifices through which the cooling medium exits said shaft to said inlet in at least one of said plurality of support wedges and for transferring the cooling medium from said outlet in each of said plurality of support wedges receiving the cooling medium to said orifices through which the cooling medium enters said shaft so as to transfer the cooling medium through said bore in at least one of said plurality of support wedges.

2. The system as claimed in claim 1, wherein each of said plurality of support wedges has an inlet and an outlet between which a bore extends such that the cooling medium is transferred through each of said plurality of support wedges.

3. The system as claimed in claim 1, wherein said means for transferring and each of said plurality of support wedges are fabricated from a material selected from the group consisting of aluminum, titanium and nonmagnetic steel.

4. The system as claimed in claim 3, wherein each of said plurality of support wedges is coated with an insulating material.

5. The system as claimed in claim 1, wherein said inlet and said outlet are in a same end of each of said plurality of support wedges having said inlet and said outlet and said means for transferring is a manifold having a plurality of conduits.

6. The system as claimed in claim 5, wherein each of said plurality of support wedges has an inlet and an outlet between which a bore extends such that the cooling medium is transferred through each of said plurality of support wedges.

7. The system as claimed in claim 1, wherein said inlet and said outlet are in opposite ends in each of said plurality of support wedges having said inlet and said outlet and said means for transferring comprises two manifolds, a first manifold disposed at a first axial end of said plurality of support wedges and having conduits extending from said orifices through which the cooling medium exits said shaft to said inlet in each of said plurality of support wedges which receive the cooling medium and a second manifold disposed at a second axial end of said plurality of support wedges and having conduits extending from said outlet in each of said plurality of support wedges receiving the cooling medium to said orifices through which the cooling medium enters said shaft.

8. The system as claimed in claim 7, wherein each of said plurality of support wedges has an inlet and an outlet between which a bore extends such that the cooling medium is transferred through each of said plurality of support wedges.

9. A conduction system through which a cooling medium can be circulated for dissipating that in a generator, comprising:
a shaft having an axial bore and at least two orifices extending radially from said bore;
a rotor mounted on said shaft having a plurality of poles;
a plurality of support wedges positioned between each of said plurality of poles, at least two of said plurality of support wedges having an inlet and an outlet between which a bore extends;
means for providing a conduit through which the cooling medium can be transferred from said outlet in one of said plurality of support wedges to said inlet in another of said plurality of support wedges; and
means disposed about said shaft for transferring the cooling medium from said orifices through which the cooling medium exits said shaft to said inlet in at least one of said plurality of support wedges and for transferring the cooling medium from said outlet in each of said plurality of support wedges receiving the cooling medium to said orifices through which the cooling medium enters said shaft so that the cooling medium circulates from said shaft to at least one of said plurality of support wedges to said means for providing a conduit to at least one other of said plurality of support wedges to said shaft.

10. The system as claimed in claim 9, wherein each of said plurality of support wedges has said inlet, said outlet and said bore and said means for transferring and said means for providing a conduit transfers the cooling medium through each of said plurality of support wedges.

11. The system as claimed in claim 10, wherein said means for transferring and each of said plurality of support wedges are fabricated from a material selected from the group consisting of aluminum, titanium and steel.

12. The system as claimed in claim 11, wherein each of said plurality of support wedges is coated with an insulating material.

13. A conduction cooling system through which a cooling medium can be circulated for dissipating that in a generator, comprising:
a shaft adapted for rotation and having an axial bore and at least two orifices extending radially from said bore;
a rotor mounted on said shaft having a plurality of poles;
a plurality of support wedges positioned between each of said plurality of poles, at least one of said plurality of support wedges having an inlet and an outlet between which a bore extends;
means mounted in said bore of said shaft for directing the exit of at least a portion of the cooling medium through at least one of said orifices from said shaft; and
means disposed about said shaft for transferring the cooling medium from said orifices through which the cooling medium exits said shaft to said inlet in at least one of said plurality of support wedges and for transferring the cooling medium from said outlet in each of said plurality of support wedges receiving the cooling medium to said orifices through which the cooling medium enters said shaft so as to allow the cooling medium to circulate through said bore in at least one of said plurality of support wedges.

14. The system as claimed in claim 13, wherein said inlet and said outlet are in opposite ends in each of said plurality of support wedges having said inlet and said outlet and said means for transferring is two manifolds, a first manifold disposed at a first axial end of said plurality of support wedges having conduits extending between said orifices through which the cooling medium exits said shaft to said inlet in each of said plurality of support wedges having said inlet through which the cooling medium can be transferred and a second manifold disposed at a second axial end of said plurality of support wedges having conduits extending between said outlet in each of said plurality of support wedges having said outlet to said orifices through which the cooling medium enters said shaft through which the cooling medium can be transferred.

15. A method for dissipating heat in a generator having an axially bored shaft, a rotor mounted on the bored shaft having a plurality of poles, and a plurality of support wedges positioned between each of the plurality of poles, at least one of the plurality of support wedges having a bore, comprising the steps of:
transferring a cooling medium through the shaft;
transferring at least a portion of cooling medium from at least one radially extending orifice in the shaft through one or more conduits and through the bore in at least one of the plurality of support wedges; and returning the cooling medium from each of the plurality of support wedges receiving the cooling medium through one or more conduits to at least one radially extending orifice in the shaft.

16. The method as claimed in claim 15, wherein said cooling medium is oil.

17. The method as claimed in claim 15, wherein the cooling medium is transferred to the plurality of support wedges and returned to the shaft by a manifold disposed at about the shaft at one end of the plurality of support wedges.

18. The method as claimed in claim 15, wherein the cooling medium is transferred to the plurality of support wedges by a first manifold disposed about the shaft at one end of the plurality of support wedges and returned to the shaft by a second manifold disposed about the shaft at a second end of the plurality of support wedges.

19. A method for dissipating heat in a generator having an axially bored shaft, a rotor mounted on the bored shaft having a plurality of poles, and a plurality of support wedges positioned between each of the plurality of poles, at least two of the plurality of support wedges having a bore, comprising the steps of:

transferring a cooling medium through the shaft;

transferring the cooling medium from the shaft through the bore in at least one of the plurality of support wedges having the bore;

circulating the cooling medium from each of the plurality of support wedges receiving the cooling medium from the shaft to at least one other of said plurality of support wedges; and returning the cooling medium to the shaft.

20. The system as claimed in claim 1, further comprising a rod having an axial bore which is fixed in said bore of said shaft.

21. The system as claimed in claim 20, wherein said means for directing is a bushing disposed about said rod, said bushing having at least one cutout face on a first side for directing the cooling medium into said shaft and at least one cutout face on a second side for directing the cooling medium out of said shaft.

22. The system as claimed in claim 1, wherein said means for transferring the cooling medium is mounted to each of said plurality of support wedges which receive the cooling medium.

23. The system as claimed in claim 9, wherein said means for transferring the cooling medium is mounted to each of said plurality of support wedges which receive the cooling medium.

24. The system as claimed in claim 13, wherein said means for transferring the cooling medium is mounted to each of said plurality of support wedges which receive the cooling medium.

25. The system as claimed in claim 14, wherein said two manifolds are mounted to each of said plurality of support wedges receiving the cooling medium.

* * * * *